Oct. 6, 1925.  
G. H. NEWMAN ET AL  
1,556,019
COOKY CUTTER
Filed Dec. 9, 1922
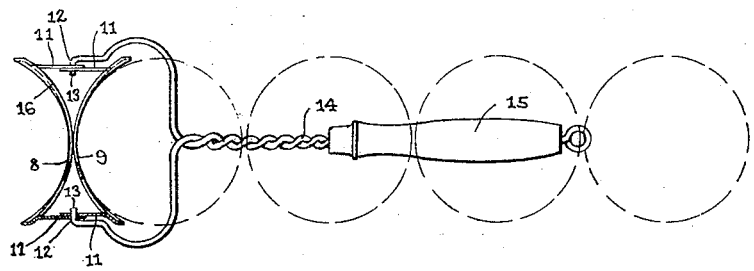
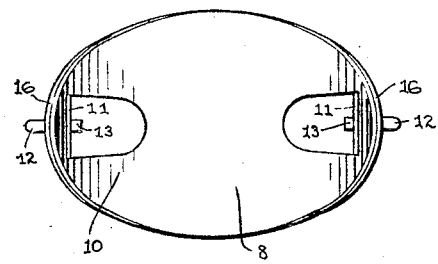 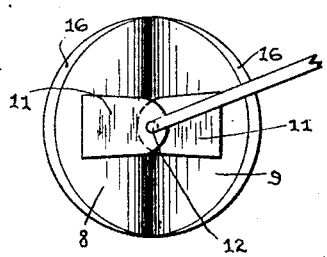
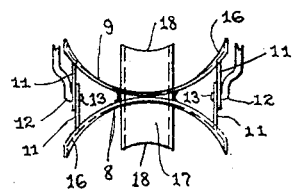 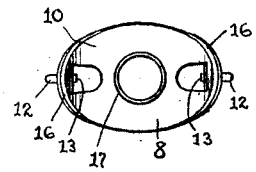
INVENTOR.  
Gertrude H. Newman  
BY Frederick Hills Newman,  
Morsell + Keeney  
ATTORNEYS.

Patented Oct. 6, 1925.

1,556,019

UNITED STATES PATENT OFFICE.

GERTRUDE H. NEWMAN AND FREDERICK HILLS NEWMAN, OF MILWAUKEE, WISCONSIN, ASSIGNORS TO AMERICAN CUTTER COMPANY, OF MILWAUKEE, WISCONSIN, A CORPORATION OF WISCONSIN.

COOKY CUTTER.

Application filed December 9, 1922. Serial No. 605,996.

*To all whom it may concern:*

Be it known that we, GERTRUDE H. NEWMAN and FREDERICK HILLS NEWMAN, citizens of the United States, and residents of Milwaukee, in the county of Milwaukee and State of Wisconsin, have invented new and useful Improvements in Cooky Cutters, of which the following is a description, reference being had to the accompanying drawings, which are a part of this specification.

This invention relates to improvements in cooky cutters.

It is one of the objects of the present invention to provide a simple revolving cutter which is adapted for cutting the dough of cookies, biscuits, doughnuts, cake, etc. into circular forms.

A further object of the invention is to provide a rotary cutter which may be pushed over the cooky dough and the like, to cut a plurality of cookies in one operation.

A further object of the invention is to provide a cooky cutter which may be pushed to rotate in a circular course.

A further object of the invention is to provide a rotary cooky cutter in which the cutting edges will always be vertically inclined when coming into contact with and leaving the material to be cut.

A further object of the invention is to provide a cutter for cookies and the like which is of very simple construction, is strong and durable and inexpensive to manufacture, and is well adapted for the purposes described.

With the above and other objects in view, the invention consists of the improved cooky cutter and its parts and combinations as set forth in the claims, and all equivalents thereof.

In the accompanying drawing in which the same reference numerals indicate the same parts in all of the views:

Fig. 1 is a side view of the improved cooky cutter;

Fig. 2 is a front view thereof;

Fig. 3 is an end view thereof;

Fig. 4 is a top view of a modified form of the invention; and

Fig. 5 is a front view thereof.

Referring now more particularly to the drawing, it will appear that the device comprises two pieces or plates of sheet metal or other suitable material 8 and 9, which are substantially elliptical in shape and are bent in the shape of an arc as clearly shown in Fig. 1. Said pieces are positioned so that their mid portions are together and with their convex sides adjacent each other. Near the end portions of the plates, pieces of the material are cut away and bent rearwardly to form tongues 11. The adjacent tongues of each of said plates overlap and are provided with registering apertures 12 which rotatably receive therein, and so as to hold plates 8 and 9 slightly slidingly together, the angularly bent end portions 13 of a handle 14 which is of bifurcated form. The grasping portion of the handle is provided with any convenient means as a wooden grip 15.

It should be noticed that the edges of the plates 8 and 9 are cupped or flanged as at 16, as appears in the drawing. Without this cupping or flanging, the cutting edges of the plates would not always be vertically inclined when coming into contact with the material to be cut, so that the thicker and tougher the material to be cut, the greater would be the resistance caused by the pressure of the plates above the cutting edge, and the plates would partially compress the material to be cut in order that the cutting edge could cut through to the bottom of the material. Hence, this difficulty has been obviated by the cupping or flanged edges 16 which always insures a clean cut without a compression of the material as the cutting edges will be vertically inclined when coming into contact with or leaving the material.

The modified form of the device illustrated in Figs 4 and 5 is specially designed for cutting doughnuts although it may also be used to cut like cake or pastry in which it is desired to have the center portion removed. To provide for the cutting out or removal of the center portion of each form cut, a tubular member 17 is inserted through the two plates 8 and 9 and through the mid-portions thereof and is of such a length as to correspond to the distance between the corresponding end portions of the two plates. Said member 17 is secured to the plates by any convenient means as by solder, and its cutting edges are curved, as at 18, to correspond with the curvature of the cutting edges of plates 8 and 9. This will insure a cleaner cut of the material for the member 17 will come into contact with the material at an angle and without said curvature only a small edge of said member would at first cut, but, by means of said curvature the member 17 will cut simultaneosly with the cutting edges of members 8 and 9.

In operation, the cutting plates are pressed against the dough or other material to be cut and the device is pushed over the same by its handle. This causes the plates to revolve about the angularly bent ends of the handle as an axis and any number of cookies can be cut in one operation, as indicated by the dotted lines in Fig. 1. It has been found that dough or pastry is rolled into a circular form before it is cut and hence, it is desirable to have a cutter which may be pushed in a circular course. When that is done, the cutter is run around the outside of the rolled out dough and a great number of cuttings may be made with a single movement of the arm and the work will be materially expedited.

From the foregoing description it will be seen that the improved cooky cutter is of very simple construction, is efficient, and is well adapted for the purpose described.

What is claimed as our invention is:

1. The combination with a handle, of a pair of curved cutting plates having flanged cutting edges, and means extending rearwardly from said plates rotatably receiving said handle, said plates being held together with their convex sides adjacent each other solely by said handle.

2. A cooky cutter, comprising a pair of curved, substantially elliptical plates fastened together with their convex sides adjacent each other and having a pair of tongues bent rearwardly so that each of said tongues will overlap the respective tongue on the adjacent plate, and a handle member extending through the overlapped tongues forming the sole means for holding the same together and journaled in said tongues to permit the rotating of said plates.

3. A cooky cutter, comprising a pair of curved, substantially elliptical plates positioned with their convex sides adjacent each other and having a pair of rearwardly extending tongues which overlap the respective tongues on the other plate, and a handle secured in said tongues thereby holding said plates slightly slidingly together and permitting the rotation thereof.

In testimony whereof, we affix our signatures.

GERTRUDE H. NEWMAN.
FREDERICK HILLS NEWMAN.